US008918737B2

(12) United States Patent
Takahashi

(10) Patent No.: US 8,918,737 B2
(45) Date of Patent: Dec. 23, 2014

(54) ZOOM DISPLAY NAVIGATION

(75) Inventor: Eduardo S. C. Takahashi, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 664 days.

(21) Appl. No.: 12/770,368

(22) Filed: Apr. 29, 2010

(65) Prior Publication Data

US 2011/0271227 A1     Nov. 3, 2011

(51) Int. Cl.
*G06F 3/048*         (2013.01)
*G06F 3/0481*      (2013.01)

(52) U.S. Cl.
CPC .... *G06F 3/0481* (2013.01); *G06F 2203/04806* (2013.01)
USPC ......................................... 715/800

(58) Field of Classification Search
USPC ......................................... 715/800
See application file for complete search history.

(56) References Cited

U.S. PATENT DOCUMENTS

| | | | |
|---|---|---|---|
| 7,072,521 B1* | 7/2006 | Cadwell | 382/251 |
| 7,262,811 B2 | 8/2007 | Burke | |
| 7,522,664 B1* | 4/2009 | Bhaskar et al. | 375/240.01 |
| 2002/0021353 A1 | 2/2002 | DeNies | |
| 2002/0092029 A1 | 7/2002 | Smith | |
| 2002/0143826 A1* | 10/2002 | Day et al. | 707/526 |
| 2004/0056899 A1* | 3/2004 | Sinclair et al. | 345/800 |
| 2004/0175059 A1 | 9/2004 | Willner et al. | |
| 2005/0001849 A1 | 1/2005 | Arcas | |
| 2005/0248545 A1* | 11/2005 | Nishimura et al. | 345/173 |
| 2007/0216712 A1 | 9/2007 | Louch | |
| 2008/0012822 A1* | 1/2008 | Sakhpara | 345/156 |
| 2008/0266458 A1 | 10/2008 | Whittaker | |
| 2009/0113278 A1 | 4/2009 | Denoue et al. | |
| 2009/0201313 A1 | 8/2009 | Thorn | |
| 2009/0252311 A1* | 10/2009 | Kuiken | 379/102.02 |
| 2009/0316795 A1 | 12/2009 | Chui et al. | |

FOREIGN PATENT DOCUMENTS

CN        101049019       10/2007
WO     2008042098 A2    4/2008

OTHER PUBLICATIONS

"PCT Search Report and Written Opinion", Application No. PCT/US2011/034162, (Oct. 28, 2011), 9 pages.
Mavlankar, et al., "Optimal Slice Size for Streaming Regions of High Resolution Video with Virtual Pan/Tilt/Zoom Functionality", Retrieved at << http://www.stanford.edu/~divad/publications/Mavlankar_07EUSIPCO_OptimalSliceSize.pdf >>, In Proceedings 15th European Signal Processing Conference (EUSIPCO'07), Sep. 2007, pp. 5.

(Continued)

*Primary Examiner* — Boris Pesin
*Assistant Examiner* — Angie Badawi
(74) *Attorney, Agent, or Firm* — Micah Goldsmith; Judy Yee; Micky Minhas

(57) ABSTRACT

Zoom display navigation is described. In embodiments, a client device renders media content with a rendering system. A focus window is generated to display a section of the media content in the focus window that maintains a display resolution quality of the media content when the media content is displayed at a zoomed magnification level. Responsive to a navigation input, the focus window can be repositioned to a different section of the media content and/or the focus window can be zoomed to a different magnification level.

20 Claims, 5 Drawing Sheets

(56) References Cited

OTHER PUBLICATIONS

Forlines, Clifton., "Content Aware Video Presentation on High-Resolution Displays", Retrieved at << http://www.merl.com/papers/docs/TR2008-020.pdf >>, AVI, Proceedings of the working conference on Advanced visual interfaces, May 28-30, 2008, pp. 10.

Li, et al., "Train Your TV", Retrieved at << http://www.stanford.edu/~leeoz/lipeleato-trainyourtv.pdf >>, CS229 Class Project, 2008, pp. 5.

Mavlankar, et al., "Video Streaming with Interactive Pan/Tilt/Zoom", Retrieved at << http://www.stanford.edu/~bgirod/pdfs/Mavlankar_Girod_Chapter_Oct09.pdf >>, 2009, pp. 1-26.

"Foreign Office Action", CN Application No. 201180021249.5, Aug. 19, 2014, 19 pages.

"Foreign Office Action", EP Application No. 11777970.2, Sep. 4, 2014, 5 pages.

"Search Report", EP Application No. 11777970.2, Aug. 28, 2014, 3 pages.

Kimata, et al., "Panorama Video Coding for User-driven Interactive Video Application", IEEE 13th International Symposium on Consumer Electronics, May 25, 2009, 3 pages.

\* cited by examiner

ZOOM DISPLAY NAVIGATION

BACKGROUND

Various media devices, such as televisions, personal media players, mobile phones, portable media devices, computer devices, and the like can all have the capability to acquire and playback or render movies, television programs, photos, data feeds, and/or music from various private and public networks, as well as from proprietary marketplaces. Media devices are increasingly used for not only communication, but to store different types of information and data, such as personal and business information, documents, pictures, and other types of data. It is increasingly commonplace to find more video content, music videos, and images that can be viewed on almost any media device that has a display screen. However, many media devices still have limited capability when displaying or rendering high quality video content, music videos, and images that are intended for display on larger type displays. These limitations can prevent high quality media content from being displayed on all of the various media devices, or require high quality media to be scaled down to fit those devices. For instance, a full high-definition video may not display all of the original details when viewing on a one-inch sized display screen that is integrated in a portable media device.

SUMMARY

This summary is provided to introduce simplified concepts of zoom display navigation that are further described below in the Detailed Description. This summary is not intended to identify essential features of the claimed subject matter, nor is it intended for use in determining the scope of the claimed subject matter.

Zoom display navigation is described. In embodiments, a client device renders media content with a rendering system. A focus window is generated to display a section of the media content in the focus window that maintains a display resolution quality of the media content when the media content is displayed at a zoomed magnification level. Responsive to a navigation input, the focus window can be repositioned to a different section of the media content and/or the focus window can be zoomed to a different magnification level.

In other embodiments, an integrated display can display a section of the media content rather than a full-size image of the media content. For example, the media content can be partitioned into blocks or sections smaller than an entire image of the media content to allow the client device to receive and display only the section or sections that are displayed in the focus window. In other embodiments, the client device can receive the section of the media content that is displayed in the focus window as well as additional sections of the media content that are adjacent to the section that is displayed in the focus window.

BRIEF DESCRIPTION OF THE DRAWINGS

Embodiments of zoom display navigation are described with reference to the following drawings. The same numbers are used throughout the drawings to reference like features and components.

DETAILED DESCRIPTION

Embodiments of zoom display navigation provide that a focus window is generated on a display screen to display media content. The focus window can display a section of media content at a zoomed magnification level without degrading a display resolution quality of the media content. For example, if the media content has higher resolution than the display screen, it may need to be scaled down for display. The display resolution quality of the focus window content that is displayed in the focus window may be maintained by applying smaller scaling factors and/or using the same number of pixels as would be used to display the same section of the image from its original format. Additionally, the focus window can be zoomed in or out and/or repositioned to a different section of the media content responsive to a navigation input. This provides that a user can view a section of an image at a larger size rather than a full-size image that is too small for viewing, and gives the user the appearance of moving around within a larger image.

The media content can be partitioned into smaller sections to optimize data transmission from a media content source to the client device. This enables the client device to receive only the section that is displayed in the focus window rather than transmitting complete data for a full-size image of the media content. This allows the client device to receive only the section that is displayed in the focus window, and optionally, additional sections adjacent to the section of the media content that is displayed.

While features and concepts of the described systems and methods for zoom display navigation can be implemented in any number of different environments, systems, and/or various configurations, embodiments of zoom display navigation are described in the context of the following example systems and environments.

Figure 1:
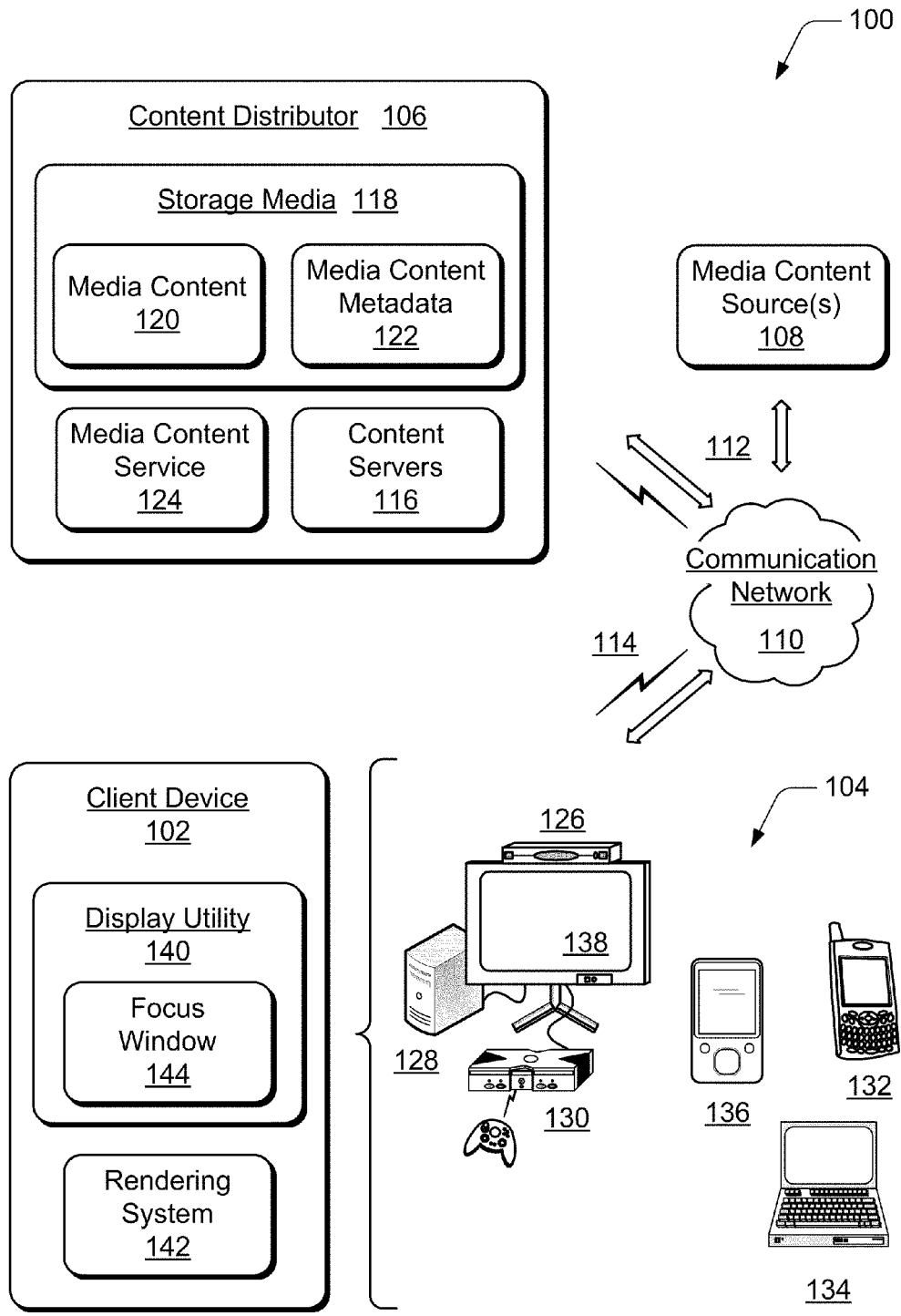
FIG. 1 illustrates an example system in which embodiments of zoom display navigation can be implemented.

FIG. 1 illustrates an example system 100 in which various embodiments of zoom display navigation can be implemented. The example system 100 includes a client device 102, which may be configured as any type of media device 104 that may be implemented to receive media content. Some of the various media devices 104 can include wired and/or wireless devices, and may also be referred to as user devices and/or portable devices. The example system 100 also includes a content distributor 106 and/or other media content sources 108 that communicate or otherwise provide media content and data to any number of the various media devices 104 via a communication network 110.

The communication network 110 can be implemented to include a broadcast network, an IP-based network 112, and/or a wireless network 114 that facilitates media content distribution and data communication between the content distributor 106, the other media content sources 108, and any number of the various media devices 104. The communication network 110 can also be implemented as part of a media content distribution system using any type of network topology and/ or communication protocol, and can be represented or otherwise implemented as a combination of two or more networks. The communication network 110 may also include a mobile operator network that is managed by a communication service provider, such as a cell-phone provider and/or Internet service provider, to facilitate mobile data and/or voice communications for any type of a wireless device or mobile phone (e.g., cellular, VoIP, Wi-Fi, etc.).

Content distributor 106 can include one or more media content servers 116 that are implemented to communicate, or otherwise distribute, media content and/or other data to any number of the various media devices 104. In this example system 100, content distributor 106 includes storage media 118 to store or otherwise maintain various media content 120 and/or data, such as media content metadata 122. The storage media 118 can be implemented as any type of memory and/or suitable electronic data storage.

The media content 120 can include any type of audio, video, and/or image data received from any type of media content source or data source. As described throughout, media content can include music (e.g., digital music files of songs), television programming, movies, on-demand media, interactive games, network-based applications, and any other audio, video, and/or image data (e.g., to include program guide data, user interface data, advertising content, closed captions data, content metadata, search results and/or recommendations, etc.). Media content 120 can include various display formats of the media content, such as a highest quality display format (e.g., a highest quality, high-definition display format, hyper-definition display format, or IMAX experience display format) to a lower quality display format (e.g., a lower quality, standard-definition display format), and any other quality of display format along a continuum between the two.

The media content metadata 122 can include any type of identifying criteria, descriptive information, and/or attributes associated with the media content 120 that describes and/or categorizes the media content 120. For example, metadata can include a media content identifier, title, subject description, a date of production, artistic information, music compilations, and any other types of descriptive information about a particular media content. Further, metadata can characterize a genre that describes media content, such as video content, as being an advertisement, a movie, a comedy show, a sporting event, a news program, a sitcom, a talk show, an action/adventure program, or as any number of other category descriptions.

Content distributor 106 may also include a media content service 124. In various embodiments, the content distributor 106 may be implemented as a subscription-based service from which any of the various media devices 104 can request media content 120 to download and display for viewing. The media content service 124 is implemented to manage the media content distribution to the various media devices 104. For example, the media content service 124 can receive a request for media content 120 from a media device 104, and communicate or provide the media content to the media device 104.

In this example system 100, a media device 104 can be implemented as any one or combination of a television client device 126 (e.g., a television set-top box, a digital video recorder (DVR), etc.), a computer device 128, a gaming system 130, an appliance device, an electronic device, and/or as any other type of media device or user device that may be implemented to receive media content in any form of audio, video, and/or image data. The various media devices 104 can also include wireless devices implemented to receive and/or communicate wireless data, such as any one or combination of a mobile phone 132 (e.g., cellular, VoIP, WiFi, etc.), a portable computer device 134, a portable media device 136 (e.g., a personal media player, portable media player, etc.), and/or any other wireless device that can receive media content in any form of audio, video, and/or image data. A client system can include a respective media device and display device 138 that together render or playback any form of audio, video, and/or image media content and media assets. The display device 138 can be implemented as any type of a television, high definition television (HDTV), LCD, or similar display system.

Any of the various media devices 104 can be configured as the client device 102 and implemented with one or more processors, communication components, memory components, signal processing and control circuits, and a media content rendering system. Further, any of the media devices 104 can be implemented with any number and combination of differing components as further described with reference to the example device shown in FIG. 6. A media device 104 may also be associated with a user (i.e., a person) and/or an entity that operates the device such that a media device 104 describes logical devices that include users, software, and/or a combination of devices.

In this example system 100, the client device 102 includes a display utility 140, a rendering system 142, and a focus window 144. The display utility 140 implements a focus window 144 for displaying media content on any type of display device. The display utility 140 can be implemented as computer-executable instructions and executed by one or more processors to implement the various embodiments and/or features described herein.

The focus window 144 can be implemented to display media content, such as a media image, as a full-screen display or partial-screen display of the entire media image or of a section of the media image. Alternatively or in addition, the focus window 144 can be implemented to display the media content at a zoomed magnification level and navigated or repositioned so as to display different sections of the media content at the zoomed magnification level. In an embodiment, the focus window 144 is implemented to display the different sections of the media content at the zoomed magnification level without degrading display resolution quality of the media content. The focus window 144 can utilize an entire display screen of the display device or of the integrated display. Alternatively or in addition, the focus window 144 can utilize a portion of the display screen while the remainder of the display screen displays the full-size media image. When the focus window 144 utilizes only a portion of the display screen, the focus window 144 can be set to a pre-defined size relative to the display screen. The size of the focus window 144 can also be adjustable by an end user.

Figure 2:
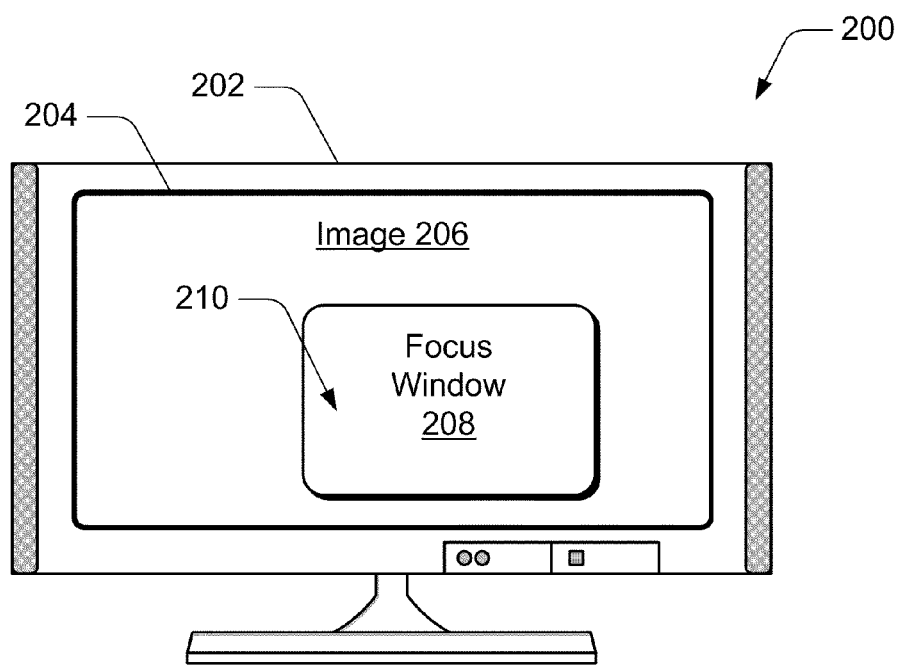
FIG. 2 illustrates an example implementation of zoom display navigation in accordance with one or more embodiments.

FIG. 2 illustrates an example 200 of zoom display navigation in accordance with one or more embodiments. A display device 202 (e.g., associated with a client device, or implemented as a client device) includes a display screen 204 on which media content can be displayed, such as an image 206 or video frame that is formatted for a full-screen display. The client device may receive image data corresponding to the image 206 that is formatted for high-definition display on a large display, high-definition television. Alternatively, the image 206 may be a scaled down version of an un-scaled display of the image data that is received by the client device. If a user desires to view a smaller section 210 of the image 206 in detail, a focus window 208 can be generated to display the smaller section 210 of the image 206 at a zoomed magnification level while maintaining the display resolution quality of the image 206.

In an embodiment, the display resolution quality of the smaller section 210 that is displayed in the focus window 208 can be maintained by scaling the pixels from the original image data that corresponds to the image 206. Alternatively or in addition, the display resolution quality of the smaller section 210 can be maintained by using the same number of pixels as would be used for displaying the corresponding section 210 of image 206 at a non-zoomed display level (e.g., 100% zoom, or at an un-scaled display level). The user can control the level of zoom by, for example, controlling a percentage of zoom, such as 200% zoom. Any suitable percentage or level of zoom may be utilized to display the smaller section 210 in the focus window 208 at a different magnification level than the non-zoomed display level that is associated with the image data received by the client device. The focus window 208 is an example implementation of the focus window 144 that is generated by a display utility of a client device as described with reference to FIG. 1.

In another example, image 206 may be a wide angle view of a football field, and the focus window 208 can be generated to zoom-in to a particular section of the football field for a closer view. The focus window 208 can be scrolled or repositioned to different locations or sections of the full-size image 206 responsive to navigation inputs. For example, navigating the focus window 208 allows a user to zoom-in to see action by one or more selected players on the football field, and also to follow the selected players as they move around, rather than viewing the entire image of the whole field and all of the players.

Figure 3:
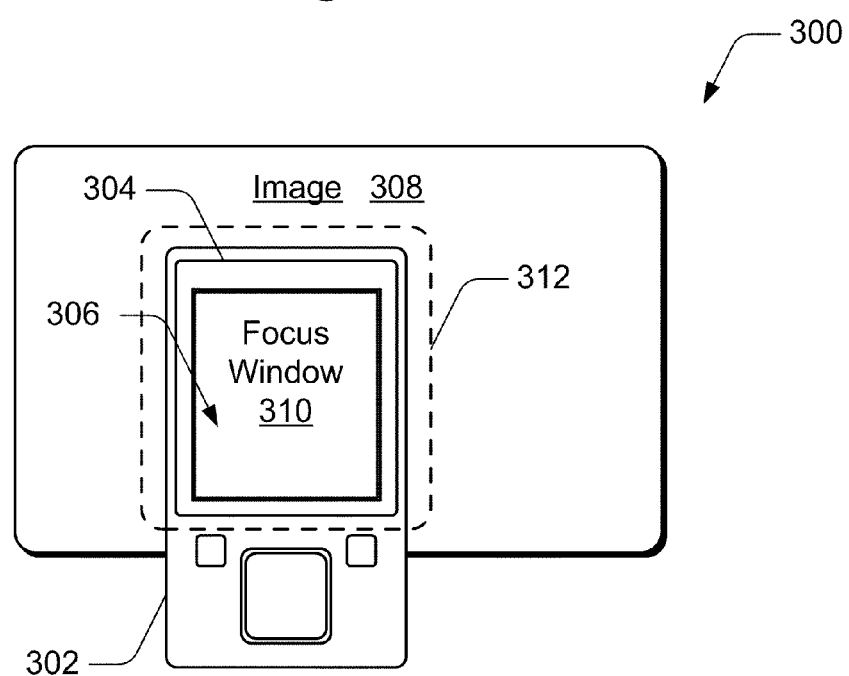
FIG. 3 illustrates an example implementation of zoom display navigation in accordance with one or more embodiments.

FIG. 3 illustrates an additional example 300 of zoom display navigation in accordance with one or more embodiments. A client device 302 includes a display screen 304 that may only be capable of displaying a section 306 of a full-size image 308 or video frame. For example, the display screen 304 visible to a user may be smaller than an actual video frame, and/or the video resolution might be much higher than that supported by the display screen 304 at the client device.

A full-size high-definition image 308 might not fit for display on the small display screen 304, or a display of a full-size image 308 may be too small for a user to view any details of the image. For example, the small client device 302, such as a mobile phone or portable media device, is likely not capable of displaying a wide format image having a 1080 display format. Similarly, a television is likely not capable of displaying a large-scale IMAX experience because the presentation format is too large to condense, or is formatted for a curved surface rather than a flat screen, such as a television screen. Additionally, a high-definition big screen television may not be capable of displaying a hyper-definition, or higher than high-definition, video.

In example 300, a focus window 310 can be implemented to display within the entire display screen 304 for zooming in or out of a section 306 of the image 308, and for navigating and/or scrolling around the image 308. This allows a user to view a section 306 of the image 308 at a larger size rather than a full-size image that is too small for viewing, and gives the user the appearance of moving the device around in a bigger image. Alternately, the section 306 of the image 308 displayed in the focus window 310 can include a smaller-scale video or a pre-defined view of the bigger image. Displaying only the focus window 310 in this manner appears as a window-view into the full-size image 308. Additionally, the image 308 can be displayed in the original display resolution of the image, and a user can control the zoom and position of the focus window 310 in the actual image. Through this window-view, a user can view the bigger image as if moving his or her head and/or eyes around the bigger image.

In an embodiment, the client device 302 can receive image data corresponding to one or more sections of the media content, rather than the complete data for a full-size media content frame. For instance, the data for the image 308 can be partitioned into smaller blocks or sections, such as at the media content distributor 106 or at another media content source 108 as described with reference to FIG. 1. The client device 302 can notify a media content source which section or sections of the media content are to be displayed in the focus window 310 and the content distributor can then select and send only the section or sections requested. The client device 302 can then receive only those sections that correspond with what is to be displayed in the focus window 310, or display screen 304, rather than complete data for the full-size image 308 of the media content. Transmission of the image data that corresponds to only requested sections of the media content, rather than the full-size image 308, can improve network bandwidth and allow the client device to display media content that would not typically be displayable on the small display screen 304 of the client device.

For instance, a cell phone can be implemented to display a section of an HD video that the cell phone would not otherwise be capable of displaying as a full-size image. Alternatively or in addition, the cell phone can receive data for section 306 of the media content for display in the focus window 310 as well as additional sections 312 of image data adjacent to the displayed section 306, rather than complete data for the full-size image 308. Reception of the additional sections 312 can improve scrolling of the focus window 310 around the bigger image 308 since some composition of the media content can be performed at the client device.

The client device can indicate a location of the focus window 310 relative to the image 308 or video frame when the client device requests media content, such as from a media content source. In the illustrated example 300, the client device 302 can indicate the location of the focus window 310 relative to the image 308 so that a media content source transmits only the section or sections of the image 308 that are to be displayed in the focus window 310 and/or the adjacent sections 312. If the focus window 310 is moved or scrolled to a different location on the image 308, the client device can request the corresponding sections for dynamic and seamless navigation of the focus window 310. Alternatively or in addition, the media content distributor 106 as described in FIG. 1, rather than the client device, can select a section that is more appropriate for viewing on a scaled display of the client device.

In an embodiment, the focus window 310 can be moved to a different location relative to the image 308, responsive to a navigation input, similar to moving a magnifying glass over a larger image. The navigation input can include any suitable input, such as scrolling buttons, a mouse, a touch pad, a joystick, a game controller, or a remote controller. The navigation input can also include motion sensors that are implemented in a remote control or embedded on the client device 302. With motion sensors incorporated into the client device 302, a user can scroll the focus window 310 by moving the client device itself. For instance, a user can scroll the focus window 310 to the right by moving or tilting the client device to the right, and the motion sensors will detect the motion. Other movements can be implemented to move the focus window 310 in other directions. Additionally, the user can zoom the focus window 310 in or out by moving or tilting the client device forward or backward, respectively (e.g., into or out of the image). Scrolling and zooming can be performed in any combination based on the movements detected by the motion sensors. The motion sensors can thus detect the movement of the input device or the client device as one or more navigation inputs, and scroll and/or zoom the focus window 310 accordingly.

Alternatively or in addition, user tracking can be implemented to navigate the focus window 310 based on movement of the user. For example, the focus window 310 can be scrolled left, right, up, or down, by recognizing that a feature of the user, such as a head, hand, etc., moves left, right, up, or down, respectively. In addition, the focus window 310 can be zoomed in or out by recognizing that a feature of the user moves closer or farther away from the display screen or a user tracking device. In addition, the focus window 310 can be jumped to a pre-defined focus window position through a small picture-in-picture (PIP) window with a mapping display. Pre-defined focus window positions can be suggested by the content distributor 106 or other media content source 108 as described in FIG. 1.

In some embodiments, such as multicast sessions (e.g., multicast live streams), the content distributor 106 can send, for example, a full hyper-definition video sequence, and then composition of the video sequence to frame the focus window 310 can be performed by the client device 302. Alternatively, such as for unicast sessions (e.g., VOD), the hyper-definition video sequence can be partitioned into smaller components and the content distributor 106 can send just the components captured by the focus window 310 at the client device 302. An optimization can include also sending surrounding or adjacent sections 312 for fast scrolling. Composition of the adjacent sections 312 can also be performed at the client device 302.

In various implementations, the focus window 310 provides more of an effect of a larger screen experience. For example, an IMAX video is typically media content formatted for a large curved surface, and part of the IMAX experience is when the viewer turns his or her head, the viewpoint changes and alters the perception of the display. For instance, objects displayed on the display screen may appear as though they are moving. This IMAX experience is typically not available on a smaller screen or display device, such as a television or mobile phone. However, zoom display navigation can provide some of the movement effect, or at least an enhanced effect by zooming in to a smaller section of a larger image and scrolling around the larger image.

Figure 4:
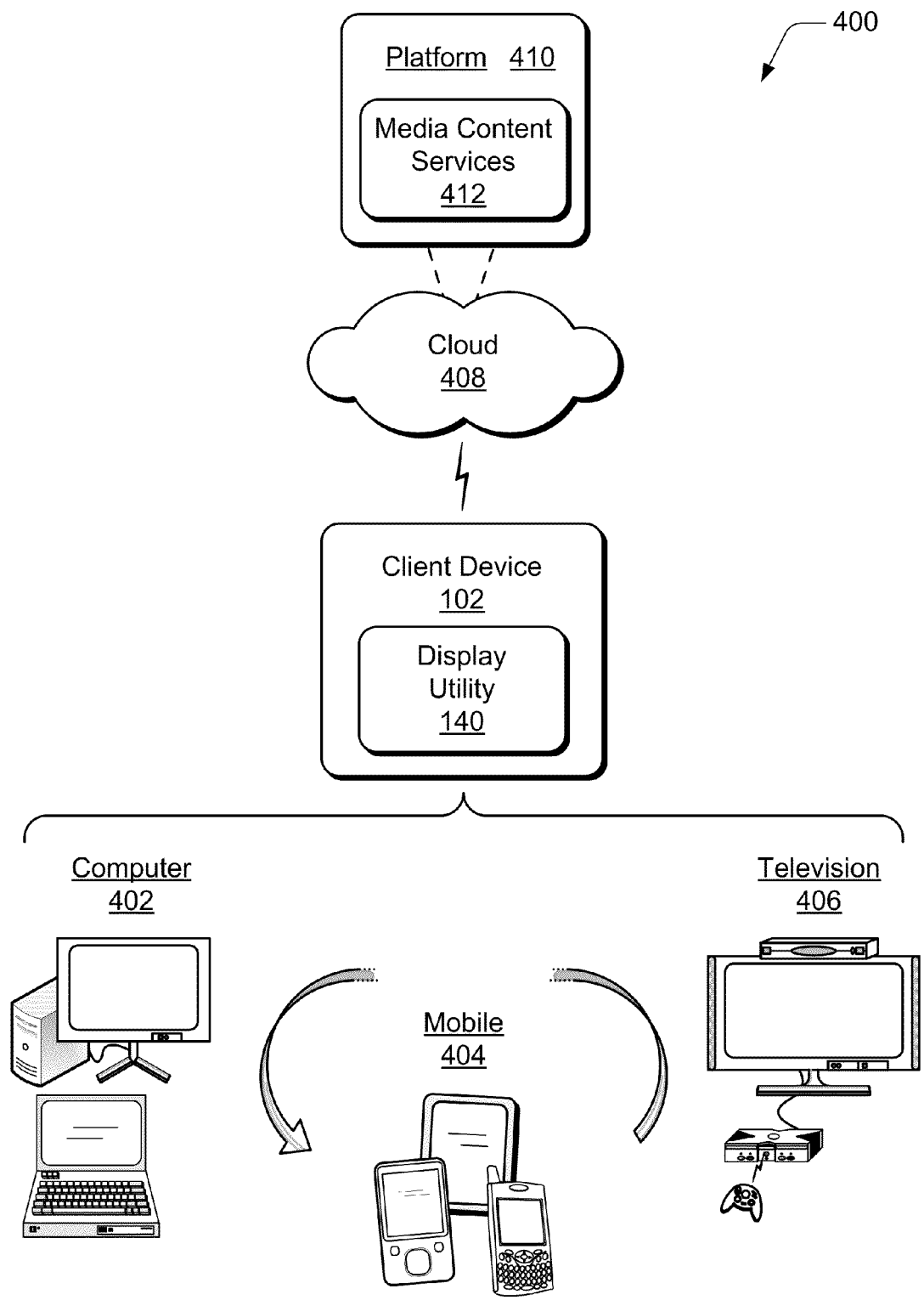
FIG. 4 illustrates an example system with multiple devices that can implement various embodiments of zoom display navigation for a seamless user experience in ubiquitous environments.

FIG. 4 illustrates an example system 400 that includes the client device 102 as described with reference to FIG. 1. The example system 400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 400, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the client device 102 may assume a variety of different configurations, such as for computer 402, mobile 404, and television 406 uses. Each of these configurations includes devices that may have generally different constructs and capabilities, and thus the client device 102 may be configured according to one or more of the different device classes. For instance, the client device 102 may be implemented as the computer 402 class of a device that includes a personal computer, desktop computer, a multi-screen computer, laptop computer, netbook, and so on.

The client device 102 may also be implemented as the mobile 404 class of device that includes mobile devices, such as a mobile phone, portable music player, portable gaming device, a tablet computer, a multi-screen computer, and so on. The client device 102 may also be implemented as the television 406 class of device that includes devices having or connected to generally larger screens in casual viewing environments. These devices include televisions, set-top boxes, gaming consoles, and so on. The techniques described herein may be supported by these various configurations of the client device 102 and are not limited to the specific examples of zoom display navigation described herein.

The cloud 408 includes and/or is representative of a platform 410 for media content services 412. The platform 410 abstracts underlying functionality of hardware (e.g., servers) and software resources of the cloud 408. The media content services 412 may include applications and/or data that can be utilized while computer processing is executed on servers that are remote from the client device 102. Media content services 412 can be provided as a service over the Internet and/or through a subscriber network, such as a cellular or WiFi network.

The platform 410 may abstract resources and functions to connect the client device 102 with other computing devices. The platform 410 may also serve to abstract scaling of resources to provide a corresponding level of scale to encountered demand for the media content services 412 that are implemented via the platform 410. Accordingly, in an interconnected device embodiment, implementation of functionality of the display utility 140 may be distributed throughout the system 400. For example, the display utility 140 may be implemented in part on the client device 102 as well as via the platform 410 that abstracts the functionality of the cloud 408.

Example method 500 is described with reference to FIG. 5 in accordance with one or more embodiments of zoom display navigation. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Figure 5:
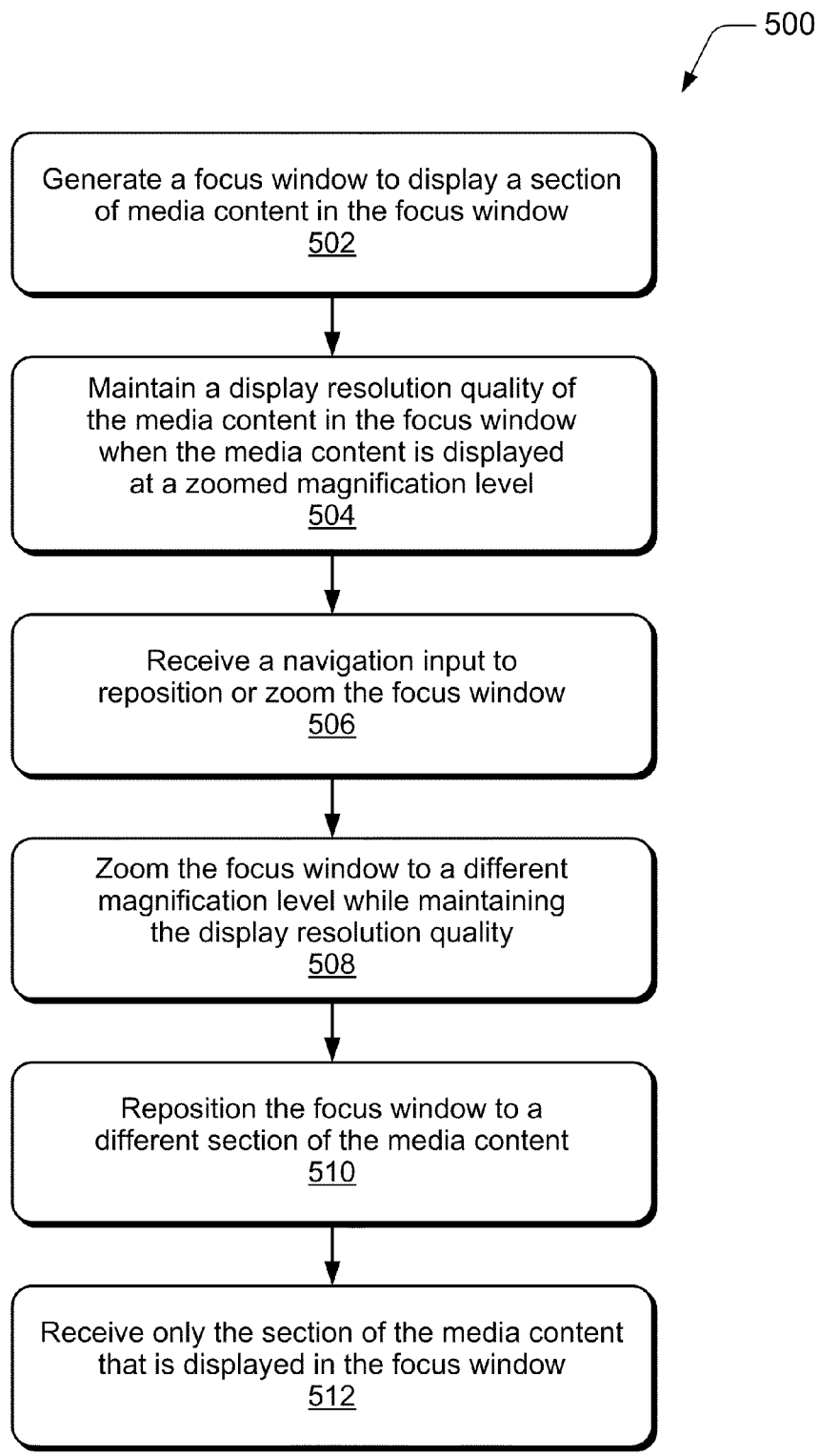
FIG. 5 illustrates example method(s) of zoom display navigation in accordance with one or more embodiments.

FIG. 5 illustrates example method(s) 500 of zoom display navigation. The order in which the method blocks are described are not intended to be construed as a limitation, and any number of the described method blocks can be combined in any order to implement a method, or an alternate method.

At block 502, a focus window is generated to display a section of media content on a display device in the focus window. For example, the focus window 208 can be displayed as a window smaller than a display screen 204 to display a section of a full-size media content frame or image 206 (FIG. 2). Alternatively, the focus window 310 can encompass the entire display screen 304 and display only a section 306 of the full media content image 308 rather than the full-size media content image (FIG. 3).

At block 504, a display resolution quality of the media content displayed in the focus window is maintained when the media content is displayed at a zoomed magnification level. For example, the display of the section 306 of the media content in the focus window 310 at the zoomed magnification level can be displayed using pixels from the image data for scaling or by using the same number of pixels as would be used for a non-zoomed display level. For example, if the media content is received as a high-definition (HD) video, but the client device 302 is not capable of displaying a full HD video frame, then the focus window 310 can display a section 306 of the HD media content that is smaller than the full HD video frame.

At block 506, a navigation input is received to reposition or zoom the focus window. For example, a navigation input can include input via any suitable input device, such as a remote controller, joystick, game controller, or keyboard. Additionally, the navigation input can be received via motion sensors that detect movement as a navigation input. For example, motion sensors may be integrated with a client device to detect movement of the client device itself as a navigation input. In embodiments, a navigation input can include user tracking to detect movement of a user or a device as navigation input.

At block 508, the focus window is zoomed-in or out to a different magnification level responsive to the navigation input while maintaining the display resolution quality. For example, the focus window can be zoomed-in to display only a small section of the full-size media content frame or image, and/or zoomed back out to display a larger section or the entire image. Display resolution quality can be maintained when zooming the focus window in or out.

At block 510, the focus window is repositioned to a different section of the media content responsive to the navigation input. For example, the focus window 208 that is smaller than the display screen 204 can move around the display screen 204 and/or image 206 displayed on the display screen 204 responsive to the navigation input. Further, the focus window 310 that overlays the entire display screen 304 can be moved around to different sections or areas of the media content frame or full-size image 308. This enables a user to control which sections of the image 308 are displayed at any given time and at any zoomed display level.

At block 512, only the section displayed in the focus window is received. For example the client device can receive only the data for the section of the media content that is displayed in the focus window rather than receiving transmission of complete data for a full-size image of the media content. In an additional embodiment, the client device can also receive additional sections of image data adjacent to the section that is displayed in the focus window.

Figure 6:
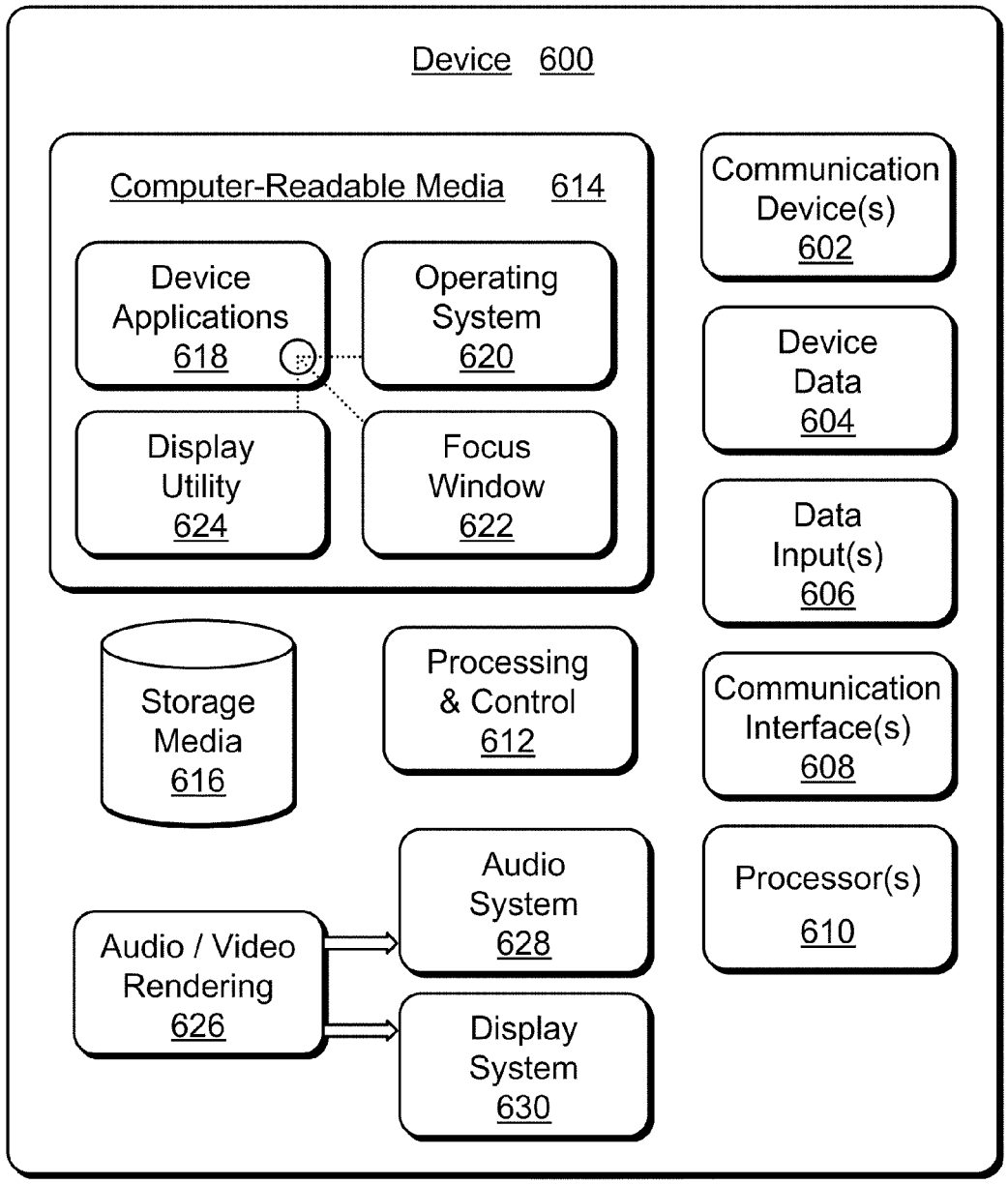
FIG. 6 illustrates various components of an example device that can implement embodiments of zoom display navigation.

FIG. 6 illustrates various components of an example device 600 that can be implemented as any type of portable and/or computing device as described with reference to the previous FIGS. 1-5 to implement embodiments of zoom display navigation. In embodiments, device 600 can be implemented as any one or combination of a wired and/or wireless device, as any form of television client device (e.g., television set-top box, digital video recorder (DVR), etc.), consumer device, computer device, server device, portable computer device, user device, communication device, video processing and/or rendering device, appliance device, gaming device, electronic device, and/or as any other type of device. Device 600 may also be associated with a user (i.e., a person) and/or an entity that operates the device such that a device describes logical devices that include users, software, firmware, and/or a combination of devices.

Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable instructions to control the operation of device 600 and to implement embodiments of zoom display navigation. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable storage media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable storage media 614 provides data storage mechanisms to store the device data 604, as well as various device applications 618 and any other types of information and/or data related to operational aspects of device 600. For example, an operating system 620 can be maintained as a computer application with the computer-readable storage media 614 and executed on processors 610. The device applications 618 can include a device manager (e.g., a control application, software application, signal processing and control module, code that is native to a particular device, a hardware abstraction layer for a particular device, etc.).

The device applications 618 also include any system components or modules to implement embodiments of zoom display navigation. In this example, the device applications 618 can include a focus window 622 and a display utility 624, such as when device 600 is implemented as a zoom display navigation device or system. The focus window 622 and the display utility 624 are shown as software modules and/or computer applications. Alternatively or in addition, the focus window 622 and/or the display utility 624 can be implemented as hardware, software, firmware, or any combination thereof.

Device 600 also includes an audio and/or video rendering system 626 that generates and provides audio data to an audio system 628 and/or generates and provides display data to a display system 630. The audio system 628 and/or the display system 630 can include any devices that process, display, and/or otherwise render audio, display, and image data. Display data and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 628 and/or the display system 630 are implemented as external components to device 600. Alternatively, the audio system 628 and/or the display system 630 are implemented as integrated components of example device 600.

Although embodiments of zoom display navigation have been described in language specific to features and/or methods, it is to be understood that the subject of the appended claims is not necessarily limited to the specific features or methods described. Rather, the specific features and methods are disclosed as example implementations of zoom display navigation.

The invention claimed is:

1. A client device, comprising:
a rendering system configured to render media content for display, the media content including partitioned video content that is partitioned into sections smaller than a full-size frame of the media content;
at least a memory and a processor that implement a display utility configured to:
generate a focus window to display a section of the partitioned video content in the focus window that maintains a display resolution quality of the partitioned video content when the partitioned video content is displayed at a zoomed magnification level;
communicate to a source of the media content that is remote from the client device an indication of a location of the focus window relative to the full-size frame of the media content to enable the source to send for display in the focus window only the section of the partitioned video content corresponding to the relative location of the focus window rather than send the full-size frame of the media content;
receive for display in the focus window, from the source of the media content, the section of the partitioned video content that corresponds to the relative location of the focus window; and
responsive to a navigation input, zoom the focus window to a different magnification level.

2. A client device as recited in claim 1, further comprising a media content input configured to receive only the section of the partitioned video content that is displayable in the focus window.

3. A client device as recited in claim 1, further comprising a media content input configured to receive only the section of the partitioned video content that is displayed in the focus window and one or more additional sections adjacent to the section that is displayed in the focus window, rather than receive complete data for the full-size frame of the media content.

4. A client device as recited in claim 1, further comprising an integrated display configured to display only the section of the partitioned video content rather than the full-size frame of the media content.

5. A client device as recited in claim 1, wherein the display utility is further configured to control a percentage of the zoomed magnification level responsive to the navigation input.

6. A client device as recited in claim 1, wherein the display utility is further configured to maintain the display resolution quality of the partitioned video content when the partitioned video content is displayed at the zoomed magnification level by displaying a same number of pixels as would be displayed for a non-zoomed display level.

7. A client device as recited in claim 1, further comprising one or more motion sensors configured to detect movement as the navigation input.

8. A computer-implemented method, comprising:
generating a focus window to display a section of media content on a display device in the focus window, the media content comprising partitioned video content that is partitioned into sections smaller than a full-size frame of the media content, the section of the media content comprising at least one of the partitioned sections;
indicating, in a request to a media content source for the media content, a location of the focus window relative to the full-size frame of the media content;
receiving, from the media content source and for display in the focus window, only the section of the media content that corresponds to the relative location of the focus window;
maintaining a display resolution quality of the section of the media content in the focus window when the section of media content is displayed in the focus window at a zoomed magnification level; and
receiving a navigation input to zoom the focus window to a different magnification level while maintaining the display resolution quality.

9. A computer-implemented method as recited in claim 8, further comprising receiving only the section of the media content that is displayed in the focus window rather than receiving transmission of complete data for a full-size image of the media content.

10. A computer-implemented method as recited in claim 8, further comprising receiving only the section of the media content that is displayed in the focus window and additional sections adjacent to the section that is displayed in the focus window.

11. A computer-implemented method as recited in claim 8, wherein maintaining the display resolution quality of the section of the media content in the focus window includes displaying a same number of pixels as would be displayed for a non-zoomed display level.

12. A computer-implemented method as recited in claim 8, further comprising detecting movement with motion sensors as the navigation input to at least one of reposition or zoom the focus window.

13. A computer-implemented method as recited in claim 12, wherein the motion sensors are embedded on the display device.

14. A computer-implemented method as recited in claim 8, further comprising displaying the section of the media content in the focus window at a higher resolution quality than a display resolution of the display device that is displaying the focus window.

15. One or more computer-readable memory hardware storage devices comprising stored instructions that are executable and, responsive to executing the instructions, a client device:
- generates a focus window to display a section of media content in the focus window that maintains a display resolution quality of the media content when the media content is displayed at a zoomed magnification level, the media content including partitioned video content that is partitioned into sections smaller than a full-size frame of the media content, the section of the media content comprising at least one of the partitioned sections;
- indicates, in a request to a remote media content source for the media content, a location of the focus window relative to the full-size frame of the media content at the zoomed magnification level;
- receives, from the remote media content source, only the section of the media content that corresponds to the relative location of the focus window for display in the focus window at the zoomed magnification level; and
- responsive to a navigation input, zooms the focus window to a different magnification level.

16. One or more computer-readable memory hardware storage devices as recited in claim 15, further comprising additional stored instructions that are executable and, responsive to executing the additional stored instructions, the client device receives only the section of the media content that is displayed in the focus window.

17. One or more computer-readable memory hardware storage devices as recited in claim 15, further comprising additional stored instructions that are executable and, responsive to executing the additional stored instructions, the client device controls a percentage of the zoomed magnification level responsive to the navigation input.

18. One or more computer-readable memory hardware storage devices as recited in claim 15, further comprising additional stored instructions that are executable and, responsive to executing the additional stored instructions, the client device receives only the section of the media content that is displayed in the focus window and one or more additional sections adjacent to the section that is displayed in the focus window, rather than a full-size image of the media content.

19. One or more computer-readable memory hardware storage devices as recited in claim 15, further comprising additional stored instructions that are executable and, responsive to executing the additional stored instructions, the client device detects movement, using motion sensors, as the navigation input to at least one of reposition or zoom the focus window.

20. A client device as recited in claim 1, further comprising an integrated display configured to display the focus window, wherein the integrated display is not capable of displaying the full-size frame of the media content in an original format of the media content.

\* \* \* \* \*